(12) United States Patent
Ahmed et al.

(10) Patent No.: US 12,715,279 B2
(45) Date of Patent: Aug. 25, 2026

(54) MODULAR MOUNTING STRUCTURE FOR WORK TRUCK ACCESSORIES

(71) Applicant: Caterpillar Global Mining Equipment LLC, Denison, TX (US)

(72) Inventors: Shamshad S. Ahmed, Oro-Vallay, AZ (US); Ankush Sharma, Jalandhar (IN); Ian A. Tiggemann, Peoria, IL (US); Gurbachan Singh Bumraw, Gilbert, AZ (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 303 days.

(21) Appl. No.: 18/415,357

(22) Filed: Jan. 17, 2024

(65) Prior Publication Data

US 2025/0229623 A1 Jul. 17, 2025

(51) Int. Cl.
*B60R 3/00* (2006.01)
*B60K 11/00* (2006.01)
*B60L 5/22* (2006.01)

(52) U.S. Cl.
CPC ................ *B60K 11/00* (2013.01); *B60L 5/22* (2013.01); *B60R 3/00* (2013.01)

(58) Field of Classification Search
CPC ...... B60K 1/00; B60K 1/04; B60K 2001/005; B60L 2200/40; B60L 2200/36; B60L 5/22; B60L 2200/28; B60R 3/00; B62D 53/061; B62D 53/06; B62D 53/08
USPC .......................................................... 180/68.1
See application file for complete search history.

(56) References Cited

U.S. PATENT DOCUMENTS

| | | | | |
|---|---|---|---|---|
| 8,616,322 | B2 * | 12/2013 | Shimomura | E02F 9/0858 180/68.1 |
| 10,563,925 | B2 * | 2/2020 | Sakaray | F28D 1/06 |
| 11,652,250 | B2 | 5/2023 | Sloan et al. | |
| 2010/0294577 | A1 * | 11/2010 | Shimomura | E02F 9/2075 180/68.5 |
| 2013/0105264 | A1 | 5/2013 | Ruth et al. | |
| 2019/0017747 | A1 * | 1/2019 | Sakaray | E21B 36/001 |
| 2022/0025609 | A1 | 1/2022 | Springer | |
| 2022/0144354 | A1 * | 5/2022 | Bolduc | B62D 53/061 |
| 2023/0069171 | A1 * | 3/2023 | Sanchez | B60R 11/04 |
| 2023/0251295 | A1 | 8/2023 | Willey et al. | |
| 2023/0256849 | A1 * | 8/2023 | Messina | B60L 53/12 180/65.31 |

FOREIGN PATENT DOCUMENTS

| | | |
|---|---|---|
| CN | 102029934 | 4/2011 |
| CN | 116022056 A | 4/2023 |
| JP | 2010-270554 A | 12/2010 |

OTHER PUBLICATIONS

Written Opinion and International Search Report for Int'l. Patent Appln. No. PCT/US2024/060439, mailed Apr. 1, 2025 (10 pgs).

* cited by examiner

*Primary Examiner* — James A Shriver, II
*Assistant Examiner* — Hilary L Johns

(57) ABSTRACT

A frame system for a truck can comprise a chassis for connecting to wheels of the truck, and a removable mounting structure attached to the chassis, wherein the removable mounting structure can be configured to support cooling accessories for a propulsion system of the truck and to receive one or more modular components for supporting cooling accessories for different types of propulsion systems.

20 Claims, 14 Drawing Sheets

MODULAR MOUNTING STRUCTURE FOR WORK TRUCK ACCESSORIES

TECHNICAL FIELD

The present disclosure relates generally, but not by way of limitation, to mounting structures for accessory components of construction vehicles. More particularly, the present disclosure relates, but not by way of limitation, to modular mounting structures for coupling different types of accessory components to a chassis for variants of a haul truck using the same or similar chassis for different propulsion systems.

BACKGROUND

Haul trucks can be used to haul various material to and from work sites. For example, haul trucks can be used to transport loads of material, such as earth, dirt, rock, gravel and other mining related natural resources. Haul trucks can operate in various environmental conditions around the world, including in arctic conditions and desert conditions, urban environments and isolated environments.

As such, haul trucks can be built in different configurations for use in different scenarios. For example, many haul trucks are configured with internal combustion engines, such as diesel engines, for use in areas where carbon fuel is widely available. However, due to environmental concerns, haul trucks can also be configured to operate using battery electric propulsion systems to reduce emissions.

Examples of structures for work vehicles can be found in: Pub. No. US 2022/0025609 A1 to Springer, titled "Internal Support Structure for Underground Battery Machines;" U.S. Pat. No. 11,652,250 B2 to Sloan et al., titled "Electric Front End Accessory Devices Assembly;" and Pub. No. CN 102029934 A to Li Jiheng et al., titled "Super-Heavy Mining Dump Truck."

SUMMARY OF THE INVENTION

A modular frame for mounting cooling accessories for different types of propulsion systems of a work machine can comprises a first vertical support structure for attaching to a chassis of the work machine, a second vertical support structure for attaching to the chassis of the work machine, and a horizontal support structure for connecting the first vertical support structure and the second vertical support structure.

A frame system for a truck can comprise a chassis for connecting to wheels of the truck, and a removable mounting structure attached to the chassis, wherein the removable mounting structure can be configured to support cooling accessories for a propulsion system of the truck and to receive one or more modular components for supporting cooling accessories for different types of propulsion systems.

A removable cooling package for a work truck can comprise a modular mounting structure that can be arranged in different configurations to receive different cooling accessories for a propulsion system of the work truck, and a first package of cooling accessories for the propulsion system of the work truck, the cooling accessories mounted to the modular mounting structure, wherein the modular mounting structure can be removed from the work truck without disassembling the first package of cooling accessories from the modular mounting structure.

DETAILED DESCRIPTION

Figure 1:
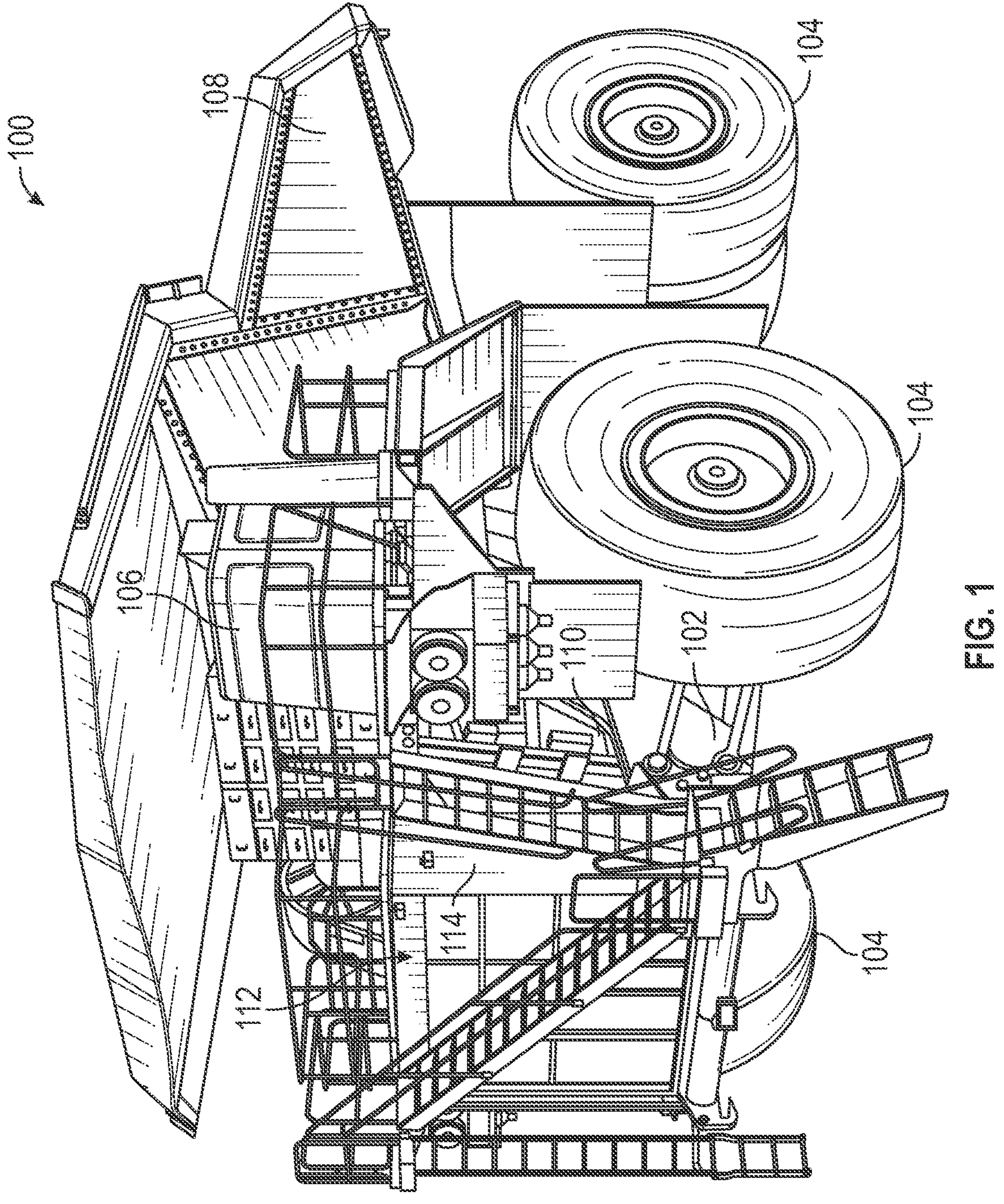
FIG. 1 is a perspective view of a haul truck comprising a mounting structure for cooling system components and other modular accessories.

FIG. 1 is a perspective view of haul truck 100 comprising frame 102, wheels 104, operator station 106, dump box 108, engine compartment 110 and cooling system 112. Haul truck 100 can be used with modular mounting structures of the present disclosure to allow different accessories for variants of haul truck 100 to be mounted to a common chassis. FIG. 1 illustrates an example of a work machine comprising a haul truck. However, the modular mounting structures of the present disclosure can be used with other work machines or vehicles, such as articulated trucks, dozers, excavators, loaders, and the like. The modular mounting structures of the present disclosure can be used with work machines having multiple variants or just a single configuration.

Wheels 104 can be rotatably mounted to frame 102. Frame 102 can comprise a chassis. In examples, wheels 104 can comprise pneumatic tires. A power plant, such as an internal combustion engine, can be located within engine compartment 110 and can be used to generate rotational shaft power to provide mechanical input to wheels 104. However, as discussed herein, the power plant can comprise a battery electric system having electric propulsion motors. As such, wheels 104 can provide motive force to haul truck 100. In additional examples, wheels 104 can be replaced by a track system.

Cooling system 112 can be connected to the power plant to provide cooling fluid or cooling air to components that are heated as a result of an internal combustion process. Cooling system 112 can comprise housing 114, such as a cowling, located on an exterior portion of frame 102 or operator station 106. In examples, cooling system 112 can comprise one or more radiator cores to interact with ambient air to provide cooling to a cooling fluid for cooling an internal combustion engine. Various cooling fluid lines can extend between housing 114 and engine compartment 110 to circulate cooling fluid. In additional examples, cooling system 112 can comprise fans, chillers, shunt tanks, and the like, that can be used for cooling internal combustion engines and battery electric systems.

Dump box 108 can be configured to receive a load of material, such as earth, dirt, rock, gravel and other mining related natural resources. At a mining site, dump box 108 can be loaded with material for transporting to a processing center, refinery or the like. The operator can activate controls within operator station 106 to cause rotation of dump box 108 to unload the materials, as is known in the art.

An operator can be situated in operator station 106 to control operation of the power plant, wheels 104, dump box 108 and cooling system 112. As such, the operator can steer wheels 104 with a steering wheel and control fuel injection or current flow to the power plant with an accelerator pedal to drive haul truck 100 to a mining site. As can be seen in FIG. 1, and discussed in more detail below, due to the large size of haul truck 100, various stairwells and guardrails can be attached to the machine to provide access to operator station 106 from ground level.

As is known, the engine or power plant within engine compartment 110 can generate heat during operation. Engines utilized in haul trucks typically generate a large amount of power in order to move haul truck 100 with a full load. In some cases, a loaded haul truck can weight up to 290,000 pounds or 145 tons (~130,000 kilograms), thereby benefiting from internal combustion engines having proportionately large displacements. As such, cooling system 112 typically has a proportionally sized capacity to remove the heat generated by the power plant. In examples, cooling system 112 can comprise one or more radiator cores sized to cool the engine or power plant with which it is combined.

In other examples, the power plant within engine compartment 110 can comprise one or more electric motors configured to rotate wheels 104 with a battery electric propulsion system. As is known in the art, batteries can output heat according to usage. However, excess temperatures of the batteries can degrade performance. Thus, it can be desirable to manage the temperature of the batteries to optimize performance. Batteries can be cooled in a variety of manners to optimize performance. In examples, a cooling fluid can be circulated around the batteries and cooled via interaction with air using, for example, one or more chillers and fans. In such variants of haul truck 100, cooling system 112 can comprise fans, chillers and the like for cooling batteries of the battery electric propulsion system.

Figure 2:
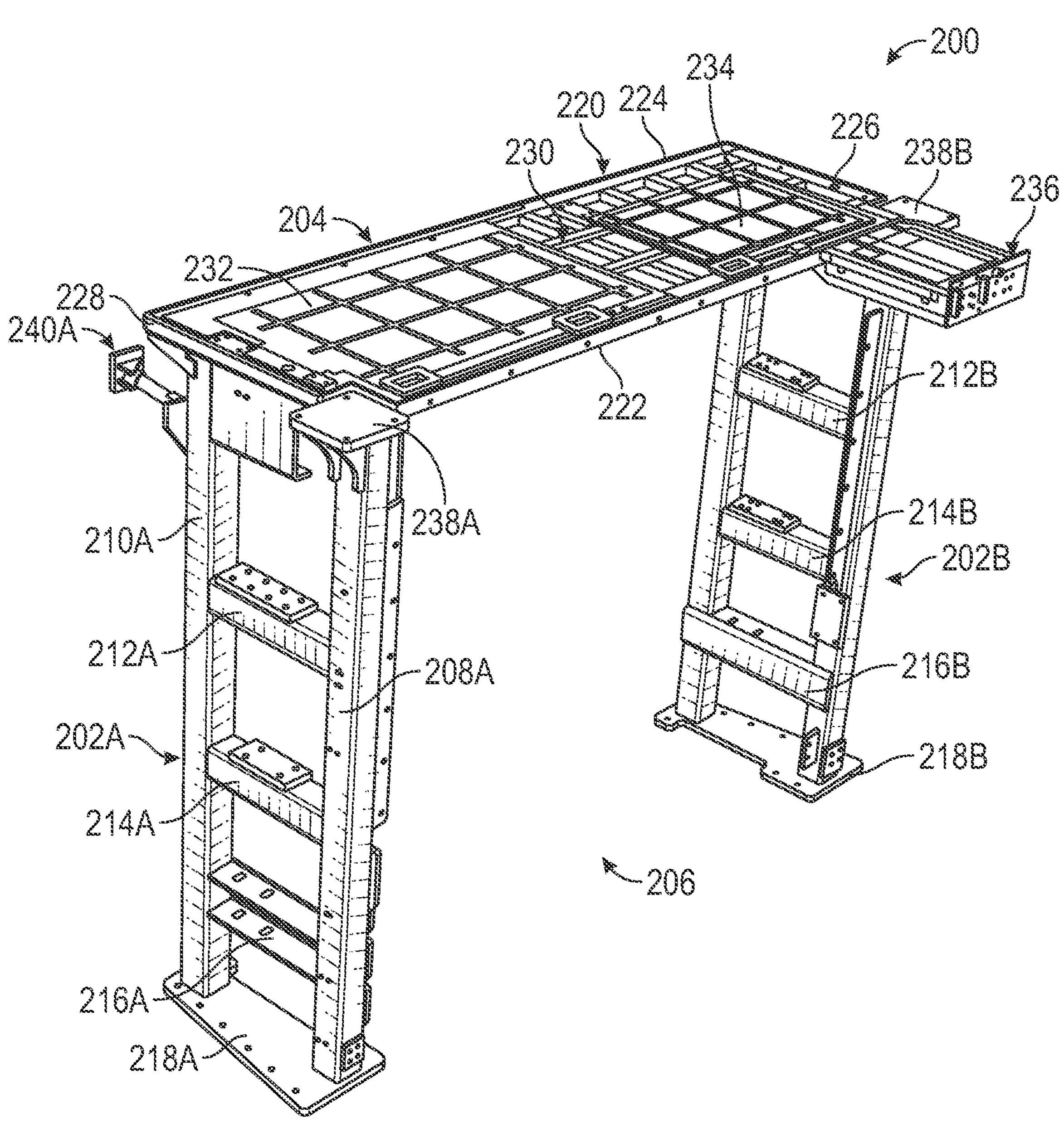
FIG. 2 is a perspective view of a modular mounting structure of the present disclosure suitable for connecting different cooling system components and other modular accessories to a haul truck.
Figure 3A:
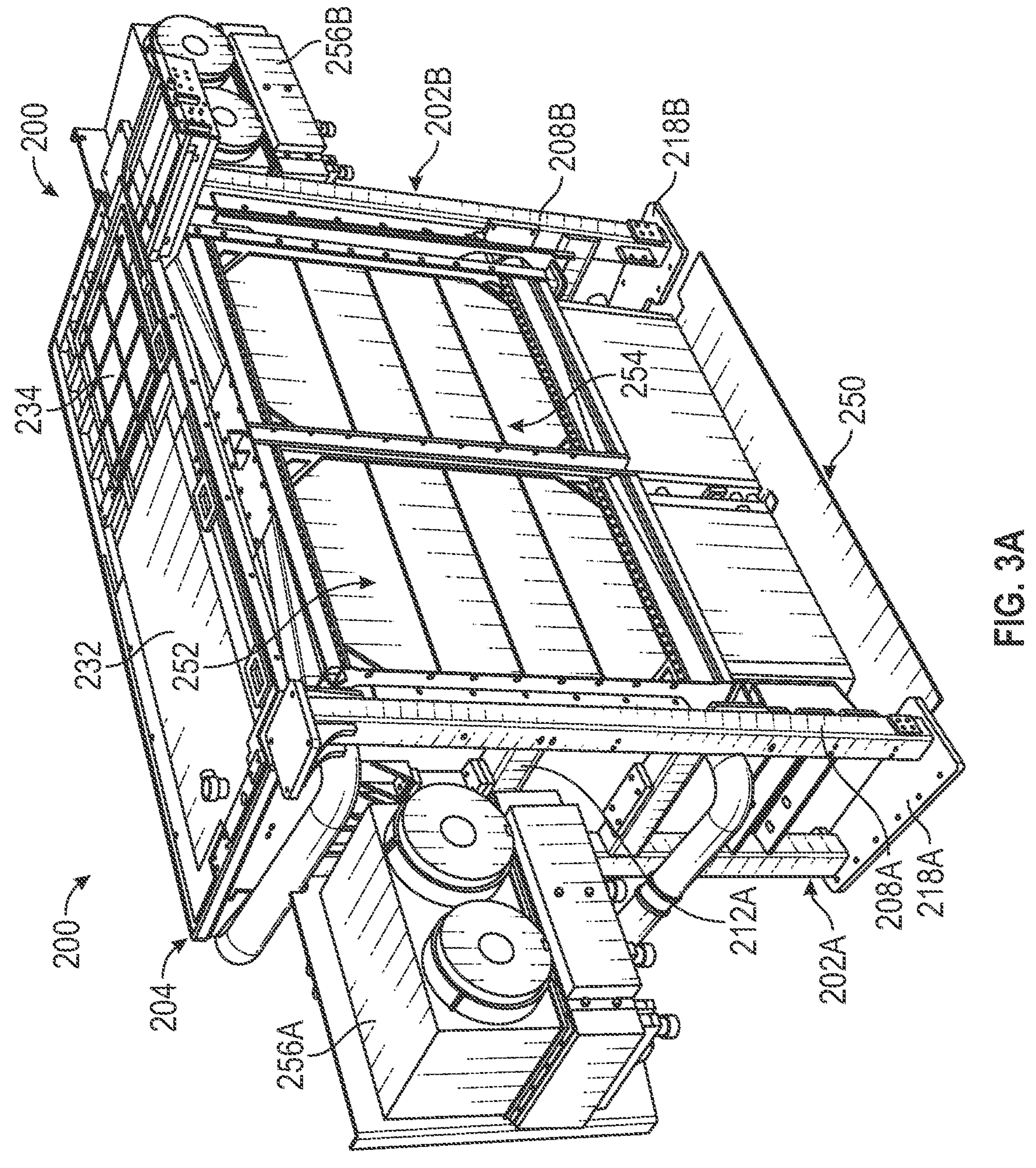
FIG. 3A is a front perspective view of the modular mounting structure of FIG. 2 having cooling system components for a diesel engine attached thereto.
Figure 3B:
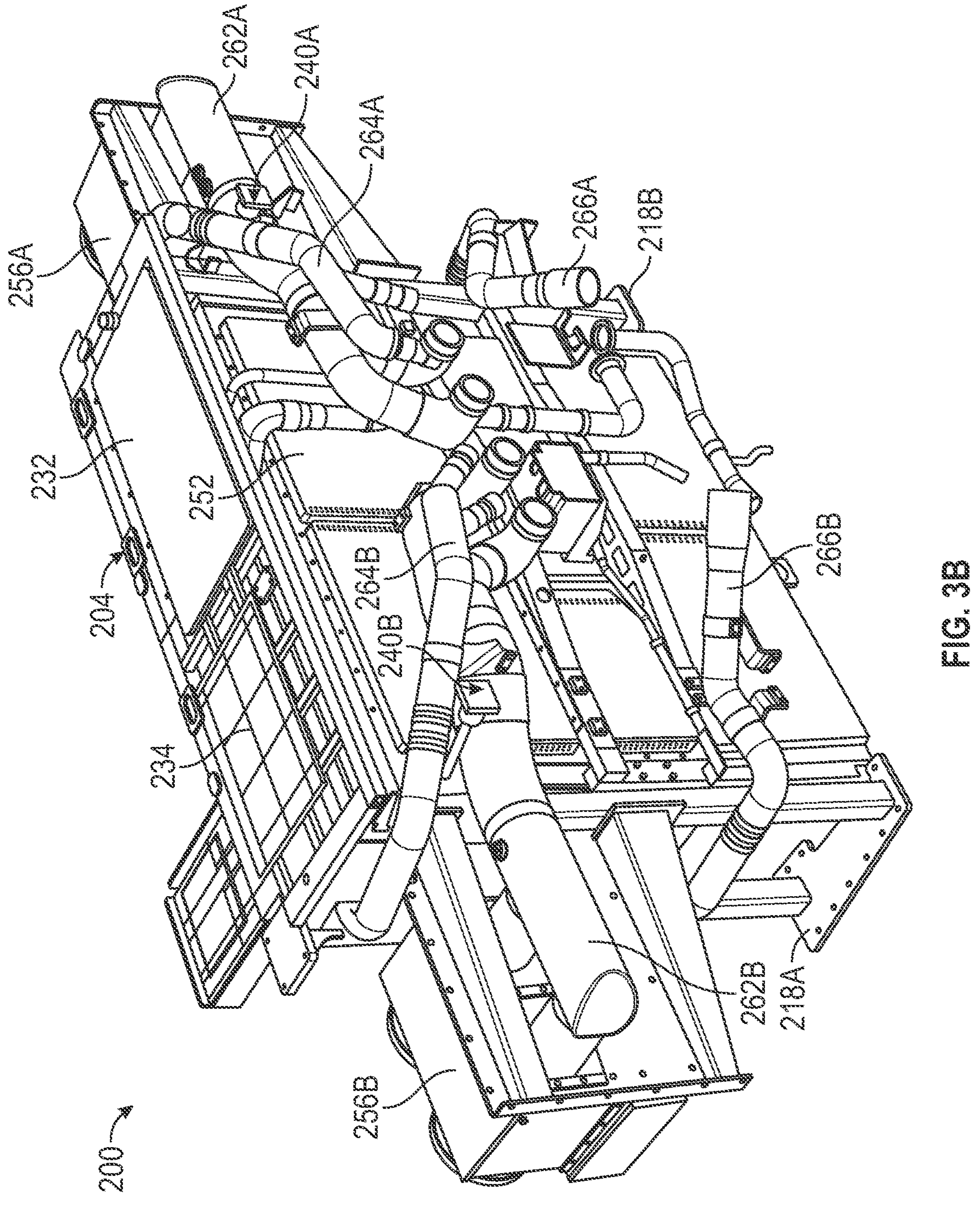
FIG. 3B is a rear perspective view of the modular mounting structure of FIG. 3A showing the cooling system components intertwined with the modular mounting structure.
Figure 6:
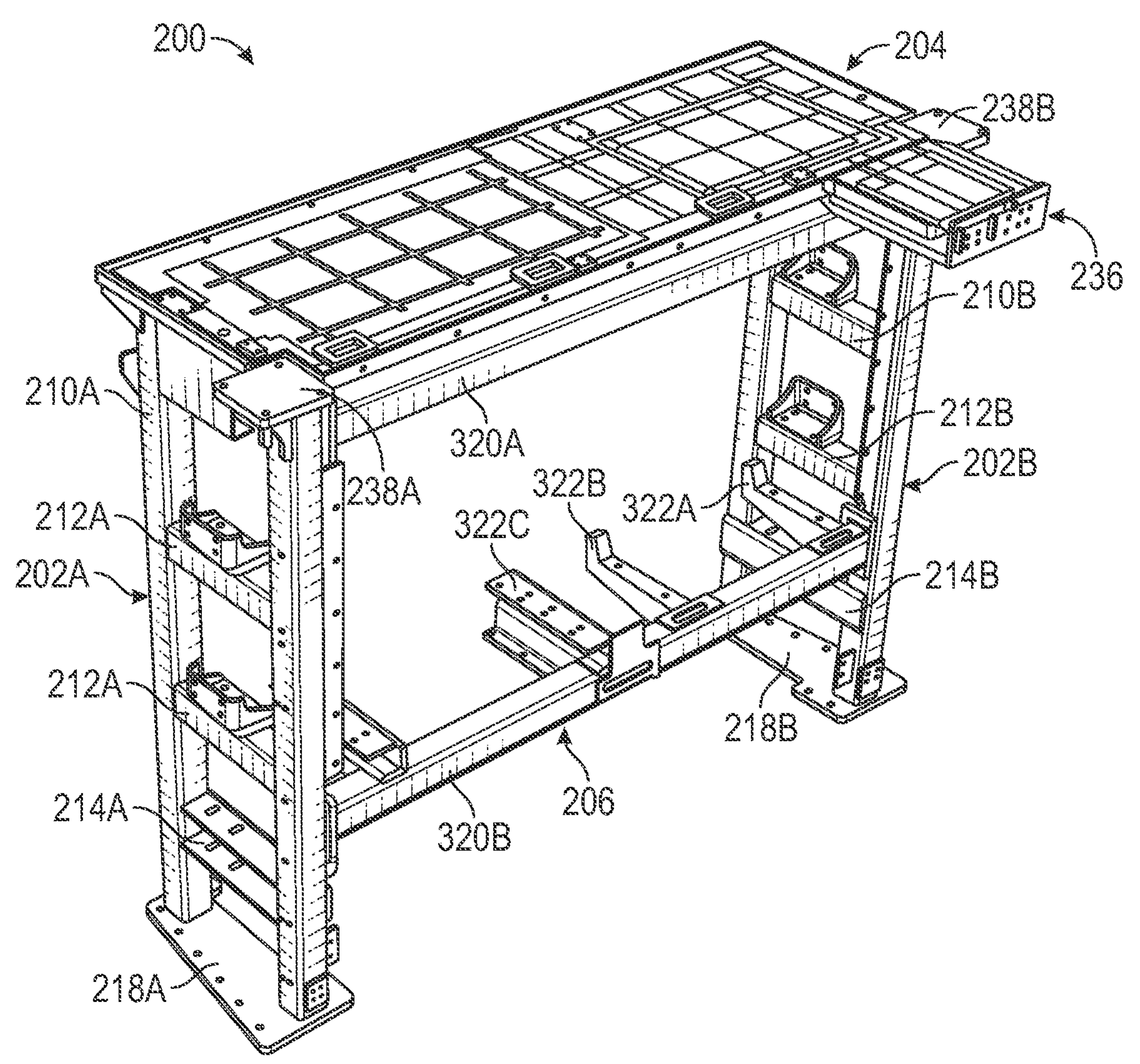
FIG. 6 is a perspective view of the modular mounting structure of FIG. 2 having modular support pieces attached thereto for supporting cooling structures of a battery electric motor.
Figure 7A:
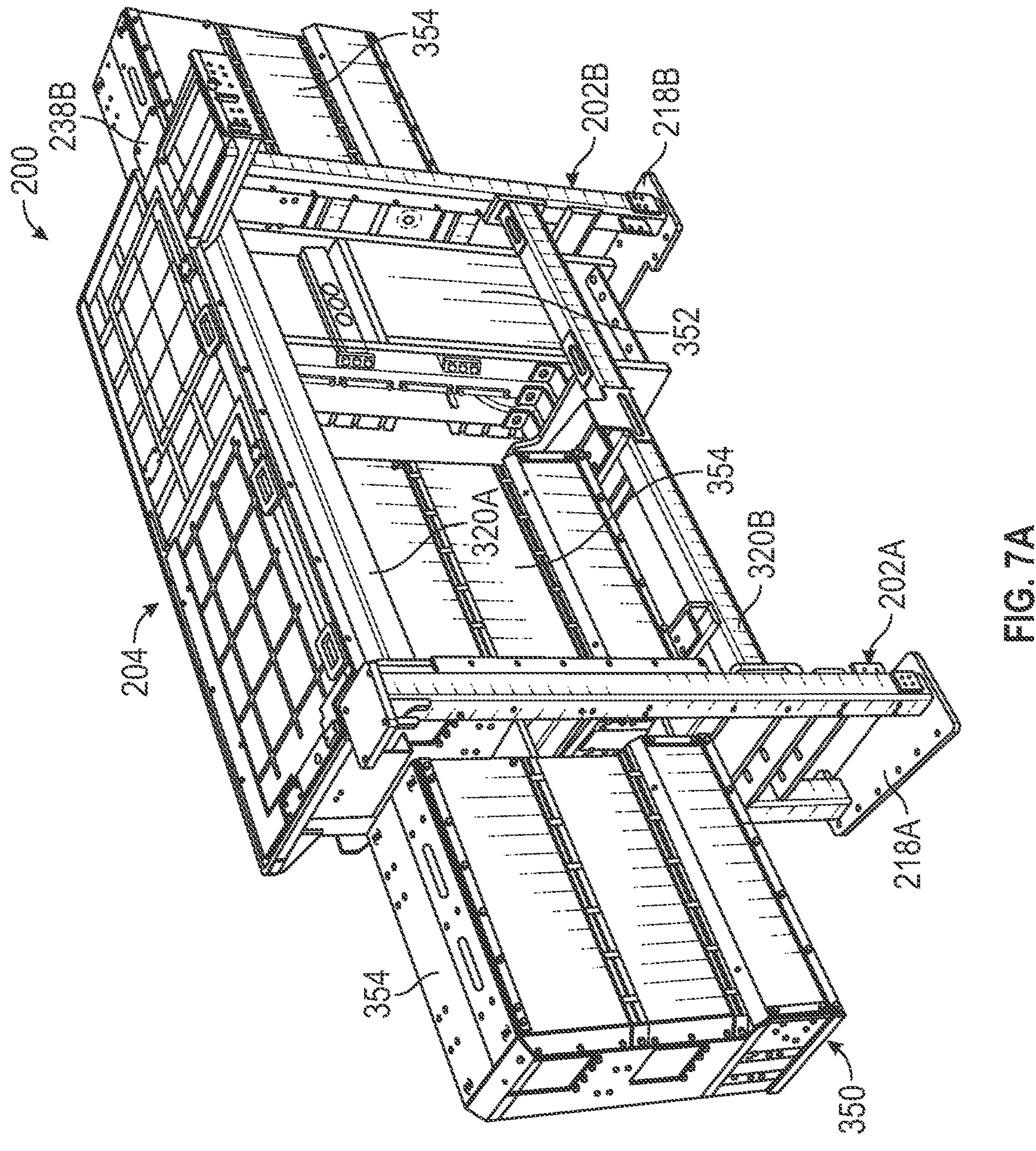
FIG. 7A is a front perspective view of the modular mounting structure of FIG. 2 having cooling system components for a battery electric motor attached thereto.
Figure 7B:
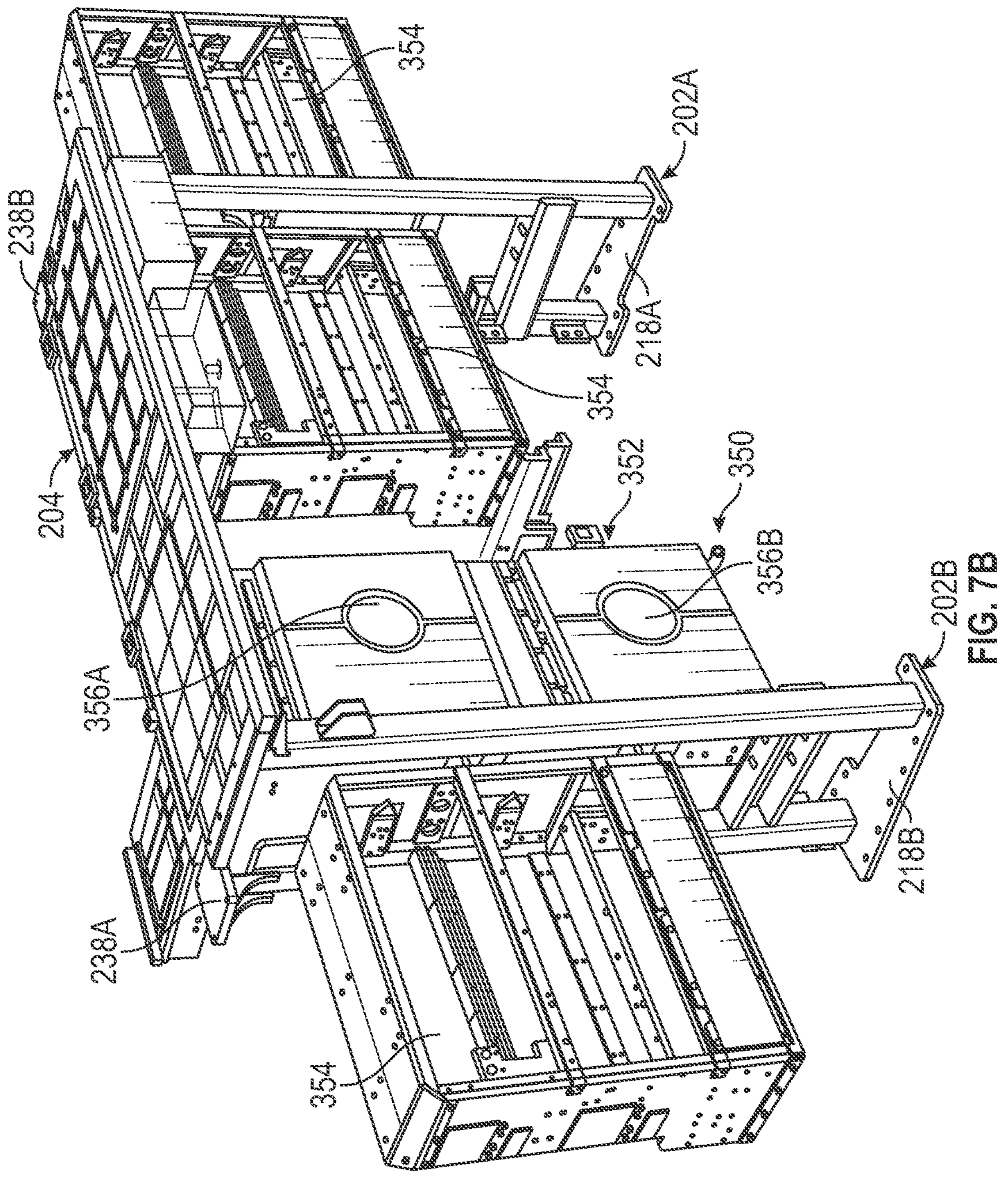
FIG. 7B is a rear perspective view of the modular mounting structure of FIG. 7A showing the cooling system components intertwined with the modular mounting structure.

In examples, housing 114 can be replaced with modular mounting structure 200 of FIG. 2 along with the cooling accessories of FIG. 3A and FIG. 3B for use with internal combustion engines or modular mounting structure 200 of FIG. 6 with the cooling accessories of FIG. 7A and FIG. 7B for use with battery electric propulsion systems.

There is currently a demand for both diesel and electric work machines, e.g., work trucks or haul trucks. For example, some work trucks work in remote areas where access to a power grid is limited and where recharging of batteries can be time consuming, thereby making diesel engines more feasible than electric motors. However, in general it is more desirable to use electric motors due to lower overall emissions and environmental impact. But it can be a challenge to manufacture work trucks that have the same performance characteristics, e.g., the same capacity of dump box 108, the same sized wheels 104, etc., that also accept both diesel and battery electric propulsion systems and associated cooling systems. For example, it can be impractical to build two completely different machines that are intended to perform the same and have a high level of commonality. In other works, it can be desirable to increase commonly used components between variants of the same work machine to reduce manufacturing and maintenance costs. As discussed herein, the present application provides modular mounting structures that can allow for mounting of different accessories or components for different types of propulsion systems to variants of a work machine sharing other components, such as a chassis. The different accessories and components can have different shapes, sizes and weight, thereby requiring different support structures, etc. With the present disclosure, the modular mounting structures can attach to a work truck in the same manner, thereby occupying the same footprint on the chassis of the work truck and requiring manufacture of a single, common component to accept either accessory package. However, the modular nature of the mounting structures can allow for the addition of supplemental support structures to support different accessories that do not impact the ability of the greater modular support structure to fit onto the work machine. In examples, the modular mounting structures can allow the accessories mounted thereto to be easily removed from the work machine as a single assembly.

FIG. 2 is a perspective view of modular mounting structure 200 of the present disclosure suitable for connecting different accessories, such as cooling system components, to a haul truck, such as haul truck 100 of FIG. 1. Modular mounting structure 200 can comprise first vertical support structure 202A, second vertical support structure 202B and horizontal support structure 204. First vertical support structure 202A, second vertical support structure 202B and horizontal support structure 204 can form a cowling having internal space 206 in which accessories can be mounted. Accessories can additionally extend out of the internal space 206 beyond the envelope, e.g., outer shape, of modular mounting structure 200.

First vertical support structure 202A can comprise first leg 208A, second leg 210A, first bracket 212A, second bracket 214A, third bracket 216A and pad 218A. Second vertical support structure 202B can comprise first leg 208B, second leg 210B, first bracket 212B, second bracket 214B, third bracket 216B and pad 218B. Horizontal support structure 204 can comprise frame 220 comprising front bar 222, back bar 224, first side bar 226 and second side bar 228. Horizontal support structure 204 can also comprise grid structure 230 located within frame 220, first platform 232 and second platform 234 supported by grid structure 230, and extension 236. Modular mounting structure 200 can further comprise first coupling pad 238A, second coupling pad 238B, first bracket 240A and second bracket 240B (FIG. 3B).

Pad 218A and pad 218B can comprise flanges or feet to allow modular mounting structure 200 to be mounted to flat surfaces. In examples, pad 218A and pad 218B can be mounted to chassis 300 of FIG. 5. Pad 218A and pad 218B can include through-bores for accepting fasteners to allow pad 218A and pad 218B to be secured, such via bolting, to a mating structure.

Figure 5:
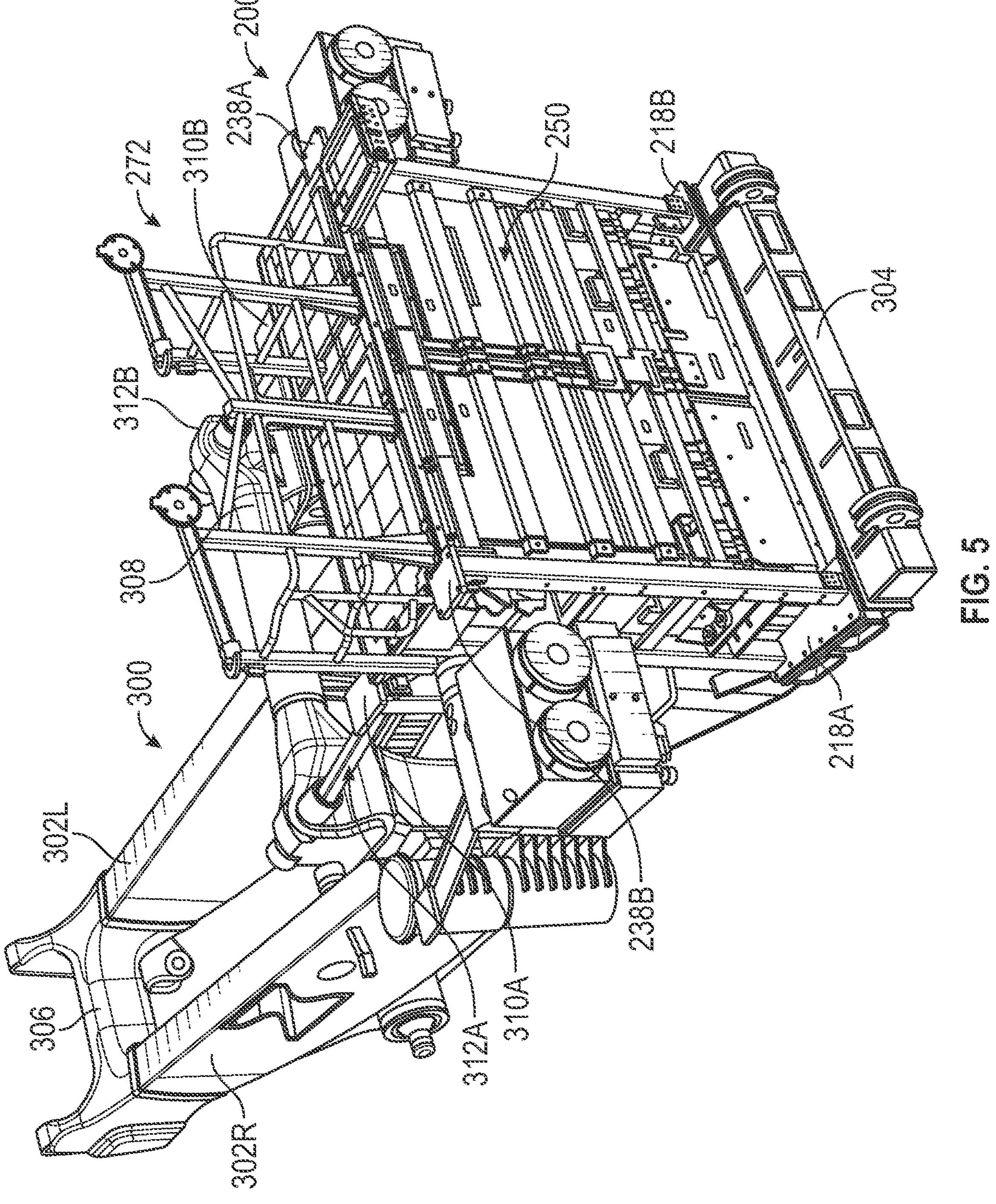
FIG. 5 is a perspective view of the modular mounting structure of FIG. 4 without the modular stairwell structure mounted to a chassis suitable for use with the haul truck of FIG. 1.

First vertical support structure 202A can be spaced apart from second vertical support structure 202B by horizontal support structure 204 in a lateral or side-to-side direction corresponding with left and right sides of haul truck 100, for example. In examples, the distance between the outer sides of first vertical support structure 202A and second vertical support structure 202B can be equal to the length of horizontal support structure 204. In examples, the distance between first vertical support structure 202A and second vertical support structure 202B can be approximately equal to the distance between complimentary structures on chassis 300, such as left side member 302L and right side member 302R (FIG. 5).

First leg 208A can be spaced from second leg 210A a longitudinal distance, e.g., a front-to-back distance, by first bracket 212A, second bracket 214A and third bracket 216A. In examples, first leg 208A and second leg 210A can be parallel such that first bracket 212A, second bracket 214A and third bracket 216A have equal lengths. First bracket 212A, second bracket 214A and third bracket 216A can provide structural rigidity to first leg 208A and second leg 210A and can provide places for mounting modular accessories or other components. First bracket 212A, second bracket 214A and third bracket 216A can include through-bores for accepting fasteners to allow modular accessories or other components to be secured, such via bolting, to the brackets. The components of second vertical support structure 202B can be configured similarly as those of first vertical support structure 202A, but as a mirror image.

Horizontal support structure 204 can be connected to the upper or top ends of first vertical support structure 202A and second vertical support structure 202B. Front bar 222, back bar 224, first side bar 226 and second side bar 228 of frame 220 can rest on ends of first vertical support structure 202A and second vertical support structure 202B. Horizontal support structure 204 can align first vertical support structure 202A and second vertical support structure 202B such that a plane formed by first leg 208A and second leg 210A is parallel to a plane formed by first leg 208B and second leg 210B. Horizontal support structure 204 can provide a rigid connection between first vertical support structure 202A and second vertical support structure 202B. Horizontal support structure 204 can be strengthened with grid structure 230 of frame 220. Grid structure 230 can comprise a plurality of members, such as wires or bars, that extend width-wise and length-wise between front bar 222 and back bar 224 and first side bar 226 and second side bar 228, respectively. Grid structure 230 can strengthen horizontal support structure 204 and provide a platform upon which other items can be placed. For example, first platform 232 and second platform 234 can comprise plates of rigid material to allow horizontal support structure 204 to form a platform to allow personnel to stand on top of modular mounting structure 200, such as with the use of modular guardrail accessory 270 and modular stairwell accessory 272 of FIG. 4. Extension 236 can comprise a platform that extends beyond the outer perimeter of horizontal support structure 204 to, for example, facilitate, connecting to modular stairwell accessory 272. First coupling pad 238A and second coupling pad 238B can extend beyond the outer perimeter of horizontal support structure 204 and can form flat surfaces for mounting other components to modular mounting structure 200. For example, modular trolley accessory 400 (FIG. 9) can be attached to first coupling pad 238A and second coupling pad 238B. First bracket 240A and second bracket 240B (FIG. 3B) can comprise connectors that couple to an upright or vertical structure of a chassis, such as bulkhead 308 of chassis 300 (FIG. 5).

First vertical support structure 202A, second vertical support structure 202B and horizontal support structure 204 can form an envelope into which accessories for the work machine, e.g., haul truck 100, can be attached. For example, internal space 206 can comprise a space that is reserved for the accessories that are to be attached to modular mounting structure 200 where other structures, components or pieces of the work machine will not be located or protrude into. Modular mounting structure 200 can thus comprise a rigid scaffold upon which accessories and components for the work machine to which modular mounting structure 200 will be coupled can be mounted. Modular mounting structure 200 can have a footprint for attaching to chassis 300 that is the same regardless of which accessories are mounted thereto and regardless of which modular support pieces, e.g., modular lower crossbar 320B of FIG. 6, are connected thereto. Modular mounting structure 200 can a) have a shape and b) be coupled to chassis 300 in a location that together allow other accessory components, e.g., modular guardrail accessory 270 and modular stairwell accessory 272 (FIG. 4), and modular trolley accessory 400 (FIG. 9), to be mounted to a work machine without interfering with other structures, components or pieces of the work machine not attached to modular mounting structure 200. As such, modular mounting structure 200 can comprise a common component between variants of a work machine that can be used to connect differently shaped accessories to a frame or chassis of the work machine that is common to both variants. As discussed herein, variants of a work machine can comprise an internal combustion engine propulsion system variant and an electric motor and battery propulsion system variant.

FIG. 3A is a front perspective view of modular mounting structure 200 of FIG. 2 having cooling accessories 250 for an internal combustion engine, e.g. a diesel engine, attached thereto. FIG. 3B is a rear perspective view of modular mounting structure 200 of FIG. 3A showing components of cooling accessories 250 intertwined with the mounting structure. FIG. 3A and FIG. 3B are discussed concurrently.

Cooling accessories 250 can comprise shunt tank 252, cooling package 254, first air cleaner 256A and second air cleaner 256B. Cooling accessories 250 can also include various plumbing features, such as pipes, ducts, tubes and the like. For example, cooling accessories 250 can include first air duct 262A, second air duct 262B, first shunt pipe 264A, second shunt pipe 264B, first coolant pipe 266A and second coolant pipe 266B, amongst others, as shown in FIG. 3B.

Cooling accessories 250 can be attached to various portions of modular mounting structure 200, such as by using threaded fasteners or the like. For example, shunt tank 252, cooling package 254 can be attached to each other and shunt tank 252 can be attached to first leg 208A and second leg 210A and cooling package 254 can be attached to first leg 208B and second leg 210B. Additionally, shunt tank 252 and cooling package 254 can be attached to horizontal support structure 204. Also, shunt tank 252 and cooling package 254 can extend downward to be flush with pad 218A and pad 218B, thereby allowing surfaces of chassis 300 to further support the weight of cooling accessories 250. As such, shunt tank 252 and cooling package 254 can be fit within internal space 206 and can be protected by first vertical support structure 202A, second vertical support structure 202B and horizontal support structure 204.

Modular mounting structure 200 can comprise a scaffold or frame to support other elements or accessories that extend outward of internal space 206. For example, first air cleaner 256A and second air cleaner 256B can be mounted to the sides of first vertical support structure 202A and second vertical support structure 202B, respectively. First air cleaner 256A can be connected to first bracket 212A and second air cleaner 256B can be connected to first bracket 212B.

Openings formed between components of modular mounting structure 200 can allow access to the accessories mounted thereto. For example, first leg 208A can be spaced from second leg 210A, and first bracket 212A, second bracket 214A and third bracket 216A can be spaced from each other to form openings or windows in modular mounting structure 200 to perform maintenance and other operations on cooling accessories 250. Additionally, grid structure 230 can comprise openings therein to allow access through horizontal support structure 204. First platform 232 and second platform 234 can be connected to horizontal support structure 204 in a pivotable or rotational manner, such as via the use of hinges, to allow first platform 232 and second platform 234 to swing away from horizontal support structure 204 to gain access to grid structure 230 and shunt tank 252 and cooling package 254 located therebelow.

Cooling accessories 250 and modular mounting structure 200 can be attached to each other to form a unit that can be easily transported for assembly and maintenance operations. In example, horizontal support structure 204 can include eyelets, shackles, brackets or swivels to allow hooks or other components of a lifting system, such as a crane, to connect thereto to allow transporting and lifting of modular mounting structure 200 with cooling accessories 250.

Figure 4:
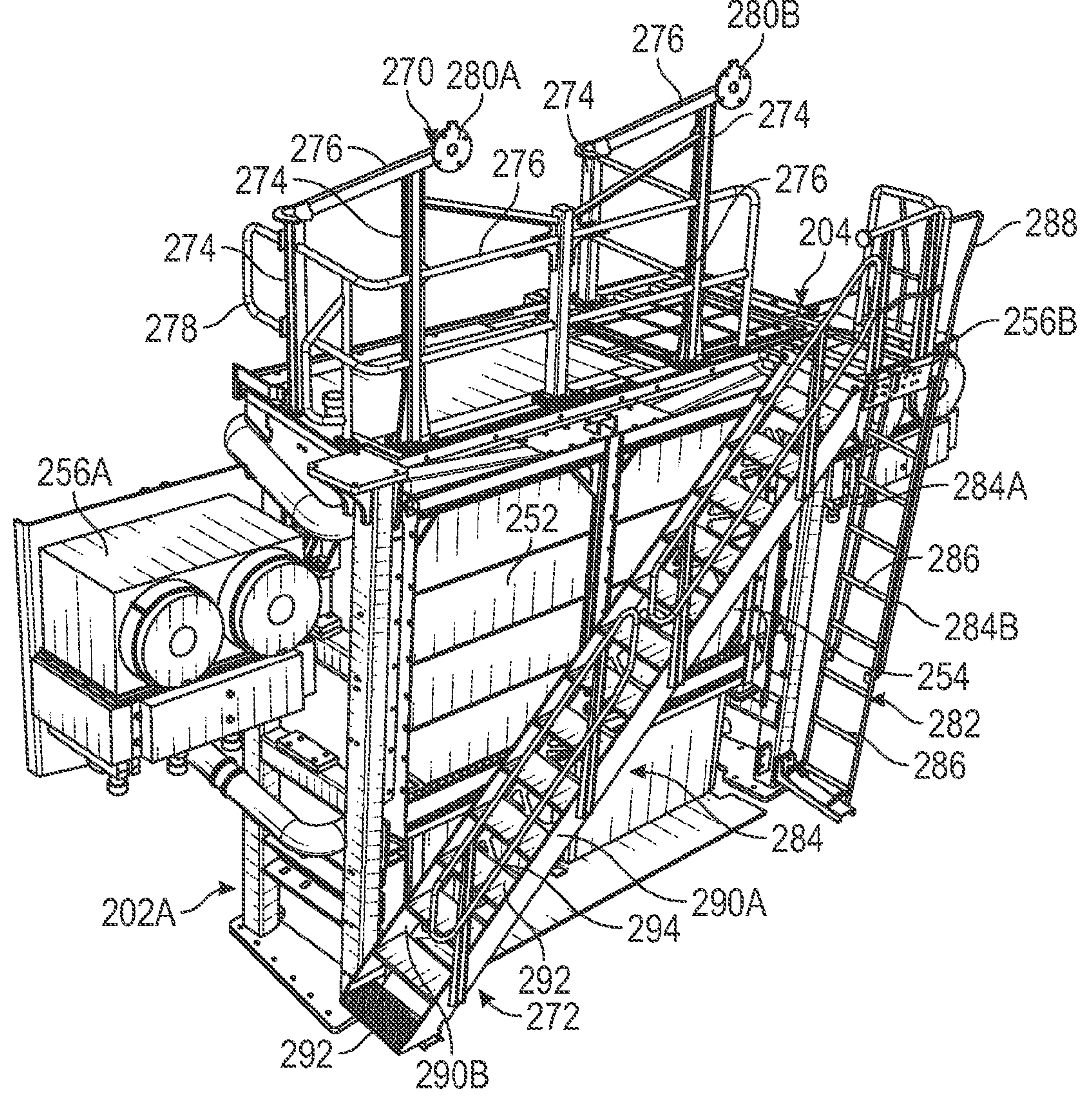
FIG. 4 is a front perspective view of the modular mounting structure of FIG. 3A and FIG. 3B having a modular stairwell structure and a modular guardrail structure mounted to the modular mounting structure.

FIG. 4 is a front perspective view of modular mounting structure 200 of FIG. 3A and FIG. 3B having modular stairwell accessory 272 and modular guardrail accessory 270 mounted to modular mounting structure 200. As mentioned with reference to FIG. 1, haul truck 100 can have a scale, e.g., size and height, that positions operator station 106 well above ground level, thereby making the use of modular stairwell accessory 272 and modular guardrail accessory 270 advantageous for accessing operator station 106. Thus, modular stairwell accessory 272 can be used to allow a user or operator to climb modular mounting structure 200 to move from ground level to the top of modular mounting structure 200. Modular guardrail accessory 270 can provide a safeguard to users and operators positioned on top of modular mounting structure to allow safe passage to an operator station, such as operator station 106.

Modular guardrail accessory 270 can comprise vertical posts 274 and horizontal rails 276. Modular guardrail accessory 270 can further comprise handrail 278 and first mounting pad 280A and second mounting pad 280B.

Modular stairwell accessory 272 can comprise ladder structure 282 and staircase structure 284. Ladder structure 282 can comprise siderail 284A, siderail 284B, rungs 286 and handrail 288. Staircase structure 284 can comprise stringer 290A, stringer 290B, treads 292 and handrail 294.

Modular guardrail accessory 270 and modular stairwell accessory 272 can comprise accessory units that can be attached to modular mounting structure 200 either before or after modular mounting structure 200 is attached to chassis 300 (FIG. 5). Modular guardrail accessory 270 and modular stairwell accessory 272 can be preassembled for attachment to modular mounting structure 200 or can be attached to modular mounting structure 200 in a piecewise manner. Cooling accessories 250 can be mounted to modular mounting structure 200 is such a manner to not interfere with modular guardrail accessory 270 and modular stairwell accessory 272. Likewise, cooling accessories 350 (FIG. 7A and FIG. 7B) can be mounted to modular mounting structure 200 in such a manner to not interfere with modular guardrail accessory 270 and modular stairwell accessory 272.

Modular guardrail accessory 270 can be mounted to the top of horizontal support structure 204. For example, vertical posts 274 can be mounted to front bar 222, back bar 224, first side bar 226 and second side bar 228 using suitable means, such as threaded fasteners.

Modular stairwell accessory 272 can be mounted to the front of modular support structure 200 using suitable means, such as threaded fasteners, and can be attached to first vertical support structure 202A, second vertical support structure 202B and horizontal support structure 204. In particular, modular stairwell accessory 272 can be attached to extension 236. Ladder structure 282 can be attached to a side of extension 236 and staircase structure 284 can be attached to an opposite side. Ladder structure 282 and staircase structure 284 can be attached to each other by handrail 288 and handrail 294. In examples, the bottom of staircase structure 284 can be attached to one or both of pad 218A and first leg 208A, and the bottom of ladder structure 282 can be attached to one or both of pad 218B and first leg 208B.

FIG. 5 is a perspective view of modular mounting structure 200 of FIG. 4 mounted to chassis 300 suitable for use with haul truck 100 of FIG. 1. Modular mounting structure 200 is shown with cooling components 150 attached thereto, as well as modular guardrail accessory 270. Though not illustrated in FIG. 5, modular stairwell accessory 272 can additionally be attached to modular mounting structure 200 while attached to chassis 300.

Chassis 300 can comprise left side member 302L, right side member 302R, front crossbar 304, rear crossbar 306 and bulkhead 308. Chassis 300 can include post 310A and post 310B that can be connected to bulkhead 308 by stabilizer 312A and stabilizer 312B.

Chassis 300 can comprise a frame or other structural body upon which components of a haul truck can be constructed. Chassis 300 can comprise frame 102 of haul truck 100 (FIG. 1). Chassis 300 can be connected to wheels, such as wheels 104 (FIG. 1), a dump box, such as dump box 108 (FIG. 1) and an operator station, such as operator station 106 (FIG. 1). Modular mounting structure 200 can be mounted to chassis 300 in a location so that modular mounting structure 200 and cooling accessories 250 do not interfere with the wheels, dump box and operator station.

Modular mounting structure 200 can be mounted to left side member 302L and right side member 302R proximate front crossbar 304. Specifically, pad 218A and pad 218B can be mounted to right side member 302R and left side member 302L, respectively. Pad 218A and pad 218B can be proximate to, adjacent or flush with front crossbar 304. Modular mounting structure 200 can be mounted to chassis 300 forward or in front of bulkhead 308. Stabilizer 312A and stabilizer 312B can extend from bulkhead 308 to other portions of chassis 300, such as posts for pad 310A and pad 310B, respectively. In examples, first bracket 240A and second bracket 240B (FIG. 3B) can extend from modular mounting structure 200 to connect to bulkhead 308 to provide strength and stability.

As discussed herein, chassis 300 can comprise a structure for supporting elements of haul truck 100 that can be used with different variants of haul truck 100. Space along chassis 300 can be reserved to receive modular mounting structure 200 regardless of the components attached to modular mounting structure 200 for the different variants of haul truck 100. Chassis 300 can be the same or identical regardless of the variant of haul truck 100. Likewise, modular mounting structure can be the same or identical regardless of the variant of haul truck 100. Thus, modular mounting structure 200 can be used to attach different components to chassis 300 for use with different propulsion systems mounted elsewhere to chassis 300.

FIG. 6 is a perspective view of modular mounting structure 200 of FIG. 2 having modular upper crossbar 320A and modular lower crossbar 320B attached thereto for supporting cooling system components of a battery electric motor, discussed with reference to FIG. 7A and FIG. 7B. Modular mounting structure 200 of FIG. 6 can include all of the same components as shown and discussed with reference to FIG. 2, with the addition of modular upper crossbar 320A and modular lower crossbar 320B.

Modular upper crossbar 320A can extend between first leg 208A and first leg 208B proximate horizontal support structure 204. Modular lower crossbar 320B can extend between first leg 208A and first leg 208B proximate pad 218A and pad 218B. Modular upper crossbar 320A and modular lower crossbar 320B can comprise crosspieces that provide additional rigidity and strength to modular mounting structure 200 thereby facilitating the ability of modular mounting structure 200 to support more weight. For example, batteries, cooling system accessories and other accessories used for battery electric motor propulsion systems can be heavier than cooling system accessories and other accessories used for interna combustion engine propulsion systems. Furthermore, modular upper crossbar 320A and modular lower crossbar 320B can provide mounting locations for cooling system components. Modular lower crossbar 320B can include first extension 322A, second extension 322B and third extension 322C, which can extend longitudinally relative to the axis of chassis 300 to support cooling system components positioned underneath horizontal support structure 204. Modular lower crossbar 320B and extensions mounted thereto can be used to support accessories and components above pad 218A and pad 218B.

Modular upper crossbar 320A and modular lower crossbar 320B can be attached to modular support structure 200 without modification of modular support structure 200. Thus, modular upper crossbar 320A and modular lower crossbar 320B can be configured to fit against existing surfaces of modular support structure 200 used with the configuration of FIG. 3A and FIG. 3B where cooling accessories 250 for an internal combustion engine are used. In examples, modular upper crossbar 320A and modular lower crossbar 320B can be attached to modular support structure 200 using any suitable means, such as welding or threaded fasteners.

FIG. 7A is a front perspective view of modular mounting structure 200 of FIG. 2 having cooling accessories 350 for a battery electric motor attached thereto. FIG. 7B is a rear perspective view of modular mounting structure 200 of FIG. 7A showing components of cooling accessories 350 intertwined with the mounting structure. FIG. 7A and FIG. 7B are discussed concurrently.

Cooling accessories 350 can comprise cooling fan rack 352 and chiller racks 354. Cooling fan rack 352 can comprise cooling fan 356A and cooling fan 356B. Chiller racks 354 can include various components for cooling electric batteries, such as fluid tanks, heat exchangers and the like. Modular mounting structure 200 can additionally be used to support batteries for battery electric propulsion systems.

Cooling accessories 350 can be attached to various portions of modular mounting structure 200, such as by using threaded fasteners or the like. For example, one of chiller racks 354 and cooling fan rack 352 can be attached to first leg 208A and first leg 208B, respectively. Additionally, the chiller rack 354 and cooling fan rack 352 can be attached to horizontal support structure 204. Also, chiller rack 354 and cooling fan rack 352 can be supported above pad 218A and pad 218B, such as via the use of first extension 322A, second extension 322B and third extension 322C. As such, the chiller rack 354 and cooling fan rack 352 can be fit within internal space 206 and can be protected by first vertical support structure 202A, second vertical support structure 202B and horizontal support structure 204.

Modular mounting structure 200 can comprise a scaffold or frame to support other elements or accessories that extend outward of internal space 206. For example, additional chiller racks 354 can be mounted to the side of first vertical support structure 202A and second vertical support structure 202B, respectively. One of chiller racks 354 can be connected to first bracket 212A and another of chiller racks 354 can be connected to first bracket 212B.

Similar to what was previously discussed with reference to cooling accessories 250, openings formed between components of modular mounting structure 200 can allow access to the accessories mounted thereto to perform maintenance and other operations on cooling accessories 350.

Similar to what was previously discussed with reference to cooling accessories 250, cooling accessories 350 and modular mounting structure 200 can be attached to each other to form a unit that can be easily transported for assembly and maintenance operations. In example, horizontal support structure 204 can include eyelets, shackles, brackets or swivels to allow hooks or other components of a lifting system, such as a crane, to connect thereto to allow transporting and lifting of modular mounting structure 200 with cooling accessories 350.

Figure 8:
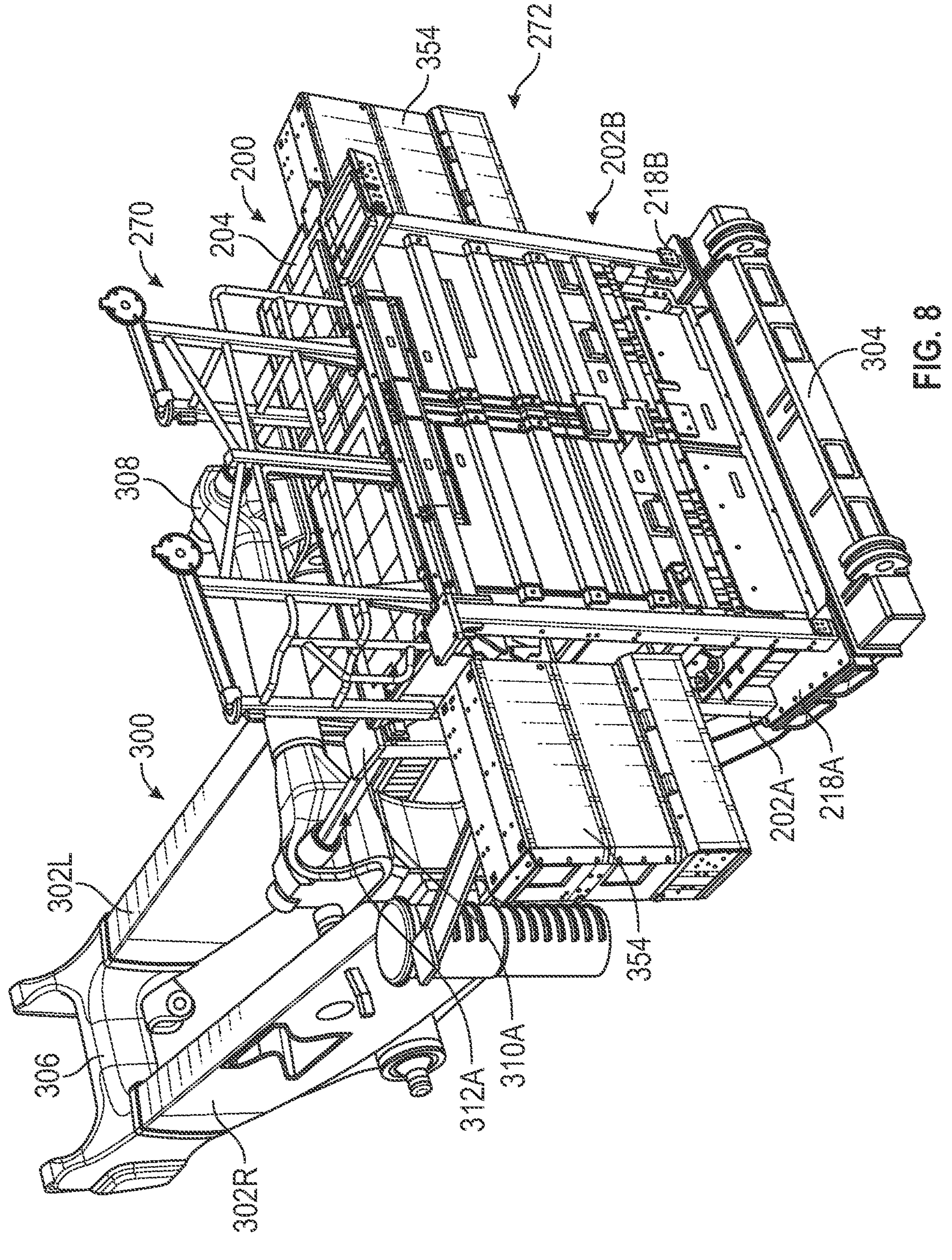
FIG. 8 is a perspective view of the modular mounting structure of FIG. 7A and FIG. 7B attached to a chassis suitable for use with the haul truck of FIG. 1.

FIG. 8 is a perspective view of modular mounting structure 200 of FIG. 7A and FIG. 7B attached to chassis 300 suitable for use with haul truck 100 of FIG. 1. Modular mounting structure 200 can additionally be attached to modular guardrail accessory 270 while being attached to chassis 300 and cooling accessories 350. Furthermore, modular mounting structure 200 can additionally be attached to modular guardrail accessory 270 (FIG. 4) while being attached to chassis 300 and cooling accessories 350.

Similar to what was discussed above with reference to cooling accessories 250, modular mounting structure 200 can be mounted to chassis 300 in a location so that modular mounting structure 200 and cooling accessories 350 do not interfere with the wheels, dump box and operator station. As discussed above, As discussed herein, chassis 300 can comprise a structure for supporting elements of haul truck 100 that can be used with different variants of haul truck 100, including those using cooling accessories 250 and cooling accessories 350. Space along chassis 300 can be reserved to receive modular mounting structure 200 regardless of the components attached to modular mounting structure 200 for the different variants of haul truck 100. Chassis 300 can be the same or identical regardless of the variant of haul truck 100. Likewise, modular mounting structure can be the same or identical regardless of the variant of haul truck 100. Thus, modular mounting structure 200 can be used to attach different components, e.g., cooling accessories 250 and cooling accessories 350, to chassis 300 for use with different propulsion systems mounted elsewhere to chassis 300.

Figure 9:
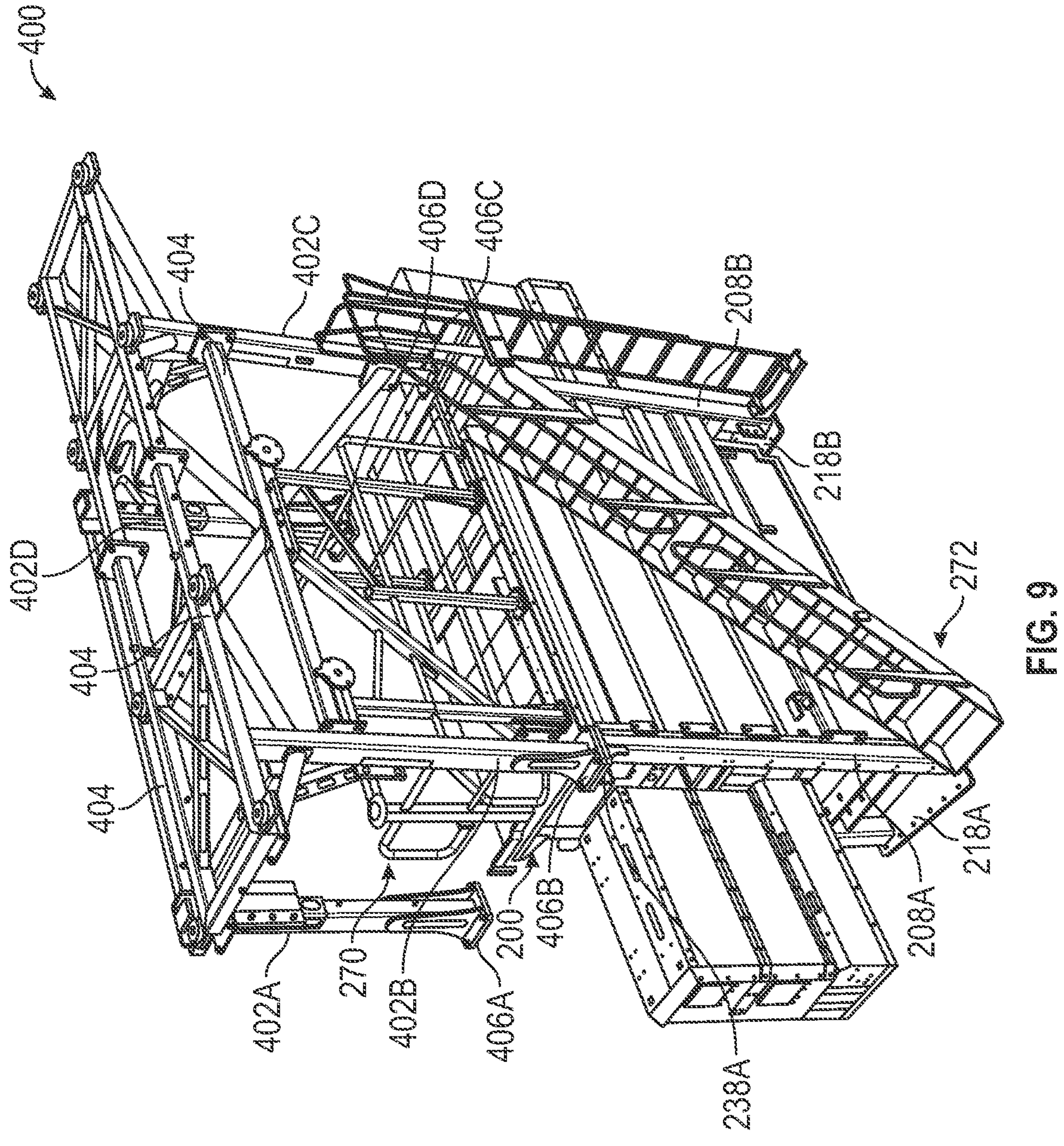
FIG. 9 is a perspective view of the modular mounting structure of FIG. 7A and FIG. 7B connected to the modular stairwell structure and modular guardrail structure of FIG. 4 and a modular trolley structure.

FIG. 9 is a perspective view of modular mounting structure 200 of FIG. 7A and FIG. 7B connected to modular guardrail accessory 270 and modular stairwell accessory 272 of FIG. 4 and modular trolley accessory 400 along with cooling accessories 350. Modular trolley accessory 400 can comprise first leg 402A, second leg 402B, third leg 402C and fourth leg 402D. Modular trolley accessory 400 can also comprise crossbars 404 for connecting first leg 402A through fourth leg 402D. First leg 402A, second leg 402B, third leg 402C and fourth leg 402D can include coupling pad 406A, pad 406B, pad 406C and pad 406D, respectively.

Modular trolley accessory 400 can comprise a structure or scaffold to allow a haul truck to be electrically connected to an overhead electrification system. For example, in battery electric propulsion configurations of a haul truck, the electric motors of the propulsion system can be configured to operate from direct electrification from electric wires, similar to a streetcar trolley system. A pantograph can be mounted to modular trolley accessory 400 to allow continuous electrical contact between the overhead electrification system and the vehicle electrical system. The pantograph can be connected to and can absorb relative movements, e.g., vertical movements, between the haul truck and the overhead electrification system while the haul truck is moving, e.g., horizontally moving. Modular trolley accessory 400 can position the pantograph forward of and above a dump box, such as dump box 108 of FIG. 1, thereby allowing the dump box to function without interference from the pantograph assembly. In examples, modular trolley accessory 400 can be used to support pantograph assemblies described in Pub. No. US 2023/0251295 A1 to Willey et al., titled "Electrical Contact Wear Monitoring System" and Pub. No. US 2013/0105264 A1 to Ruth et al., titled "Pantograph Assembly." Modular trolley accessory 400 can connect to modular mounting structure 400 for variants of haul truck 100, e.g., those using either cooling accessories 250 or cooling accessories 350, without interfering with those components or modular guardrail accessory 270 and modular stairwell accessory 272 or chassis 300.

Figure 10:
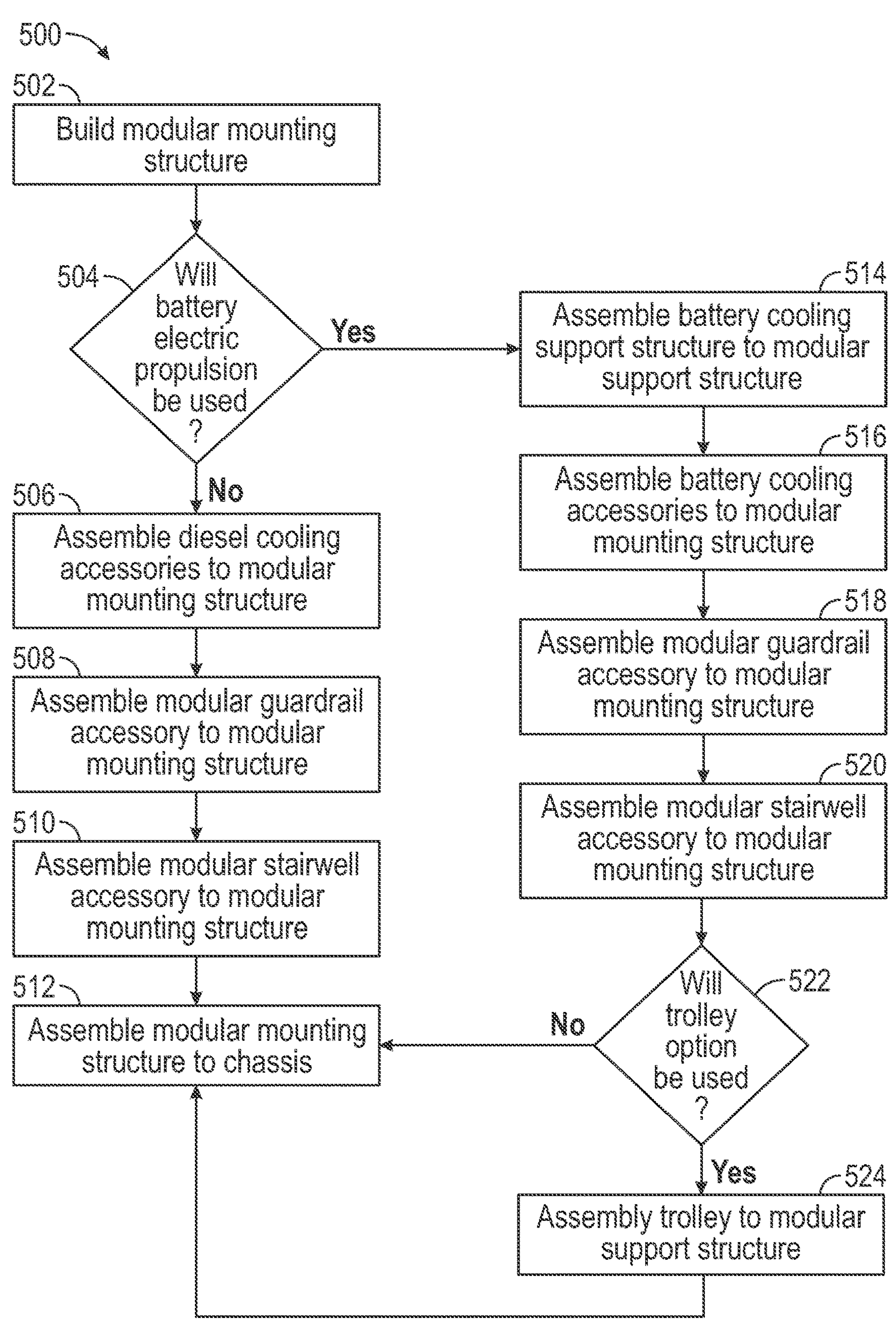
FIG. 10 is a line diagram illustrating various operations for assembling a modular mounting structure with accessory components for two different configurations and use with a common chassis, according to the present disclosure.

FIG. 10 is a line diagram illustrating method 500 including various operations for assembling modular mounting structure 200 and associated accessories, such as cooling accessories 250 and cooling accessories 350, for different configurations or variants of a haul truck. FIG. 10 is discussed with reference to operation 502 through operation 524. However, in other examples, some of operation 502 through operation 524 can be omitted and, in examples, operation 502 through operation 524 can be performed in other sequences.

Method 500 can be used to assemble sub-components of modular mounting structure 200, e.g., first vertical support structure 202A, second vertical support structure 202B and horizontal support structure 204, with each other to form modular mounting structure 200, modular support pieces, e.g., modular upper crossbar 320A and modular lower crossbar 320B, with modular mounting structure 200 to support variations of accessories supported by modular mounting structure 200, modular accessories, such as cooling accessories 250 or cooling accessories 350 with modular mounting structure 200 depending on the variant of vehicle to be built, and modular components, such as modular of modular guardrail accessory 270 and modular stairwell accessory 272, with modular mounting structure 200.

At operation 502, modular mounting structure 200 can be built. Horizontal support structure 204 can be attached to first vertical support structure 202A and second vertical support structure 202B, such as via the use of threaded fasteners. Horizontal support structure 204, first vertical support structure 202A and second vertical support structure 202B can be fabricated and assembled using conventional manufacturing techniques.

At operation 504, it can be determined if modular mounting structure 200 will be equipped for use with a haul truck that will be configured to operate with an internal combustion engine, e.g., a diesel engine, or an electric motor operating with a battery system. If modular mounting structure 200 will be used with an internal combustion engine, method 500 can proceed to operation 506. If modular mounting structure 200 will be used with a battery electric system, method 500 can proceed to operation 514.

At operation 506, modular mounting structure 200 can be assembled with diesel cooling accessories, such as cooling accessories 250. The diesel engine cooling accessories can comprise cooling accessories 250 of FIG. 3A and FIG. 3B, including shunt tank 252, cooling package 254, first air cleaner 256A and second air cleaner 256B. Cooling accessories 250 can also include various plumbing features, such as pipes, ducts, tubes and the like. Cooling accessories 250 can further include first air duct 262A, second air duct 262B, first shunt pipe 264A, second shunt pipe 264B, first coolant pipe 266A and second coolant pipe 266B, amongst others. Cooling accessories 250 can be mounted with internal space 206 of modular support structure 200 to not interfere with pad 218A and pad 218B or other places where modular mounting structure 200 mates with chassis 300.

At operation 508, modular guardrail accessory 270 can be assembled with modular mounting structure 200, such as by using threaded fasteners to attach modular guardrail accessory 270 atop horizontal support structure 204. Modular guardrail accessory 270 can be mounted to modular mounting structure 200 to not interfere with cooling accessories 250 or places where modular mounting structure 200 mates with chassis 300.

At operation 510, modular stairwell accessory 272 can be assembled with modular mounting structure 200, such as by using threaded fasteners to attach modular stairwell accessory 272 to pad 218A, pad 218B and extension 236. Modular stairwell accessory 272 can be mounted to modular mounting structure 200 to not interfere with cooling accessories 250 or places where modular mounting structure 200 mates with chassis 300.

At operation 512, modular mounting structure 200, along with cooling accessories 250, modular guardrail accessory 270 and modular stairwell accessory 272 can be attached to chassis 300. As discussed, modular mounting structure 200, cooling accessories 250 (or cooling accessories 350), modular guardrail accessory 270 and modular stairwell accessory 272 can be lifted as a single assembly.

At operation 514, modular support pieces can be assembled with modular mounting structure 200. For example, modular upper crossbar 320A and modular lower crossbar 320B can be assembled with modular mounting structure 200, such as via the use of threaded fasteners. Modular upper crossbar 320A can extend between first leg 208A and first leg 208B proximate horizontal support structure 204. Modular lower crossbar 320B can extend between first leg 208A and first leg 208B proximate pad 218A and pad 218B. Modular upper crossbar 320A and modular lower crossbar 320B can be mounted to modular mounting structure 200 to not interfere with cooling accessories 350 or places where modular mounting structure 200 mates with chassis 300.

At operation 516, modular mounting structure 200 can be assembled with electric cooling accessories, such as cooling accessories 350. The electric cooling accessories can comprise cooling accessories 350 of FIG. 7A and FIG. 7B, including fan rack 352 and chiller racks 354. Cooling accessories 350 can also include various plumbing features, such as pipes, ducts, tubes and the like. Cooling accessories 350 can be mounted with internal space 206 of modular support structure 200 to not interfere with pad 218A and pad 218B or other places where modular mounting structure 200 mates with chassis 300.

At operation 518, modular guardrail accessory 270 can be assembled with modular mounting structure 200, such as by using threaded fasteners to attach modular guardrail accessory 270 atop horizontal support structure 204. Modular guardrail accessory 270 can be mounted to modular mounting structure 200 to not interfere with cooling accessories 350 or places where modular mounting structure 200 mates with chassis 300.

At operation 520, modular stairwell accessory 272 can be assembled with modular mounting structure 200, such as by using threaded fasteners to attach modular stairwell accessory 272 to pad 218A, pad 218B and extension 236. Modular stairwell accessory 272 can be mounted to modular mounting structure 200 to not interfere with cooling accessories 350 or places where modular mounting structure 200 mates with chassis 300.

At operation 522, it can be determined if modular trolley accessory 400 (FIG. 9) will be used with modular mounting structure 200. If modular mounting structure 200 will be used with modular trolley accessory 400, method 500 can proceed to operation 524. If modular mounting structure 200 will be used without modular trolley accessory 400, method 500 can proceed to operation 512.

At operation 524, modular trolley accessory 400 can be assembled to modular mounting structure 200 such as by using threaded fasteners to attach modular trolley accessory 400 to first coupling pad 238A and second coupling pad 238B. Modular trolley accessory 400 can be mounted to modular mounting structure 200 to not interfere with cooling accessories 350 or places where modular mounting structure 200 mates with chassis 300. Thereafter, method 500 can proceed to operation 512.

Figure 11:
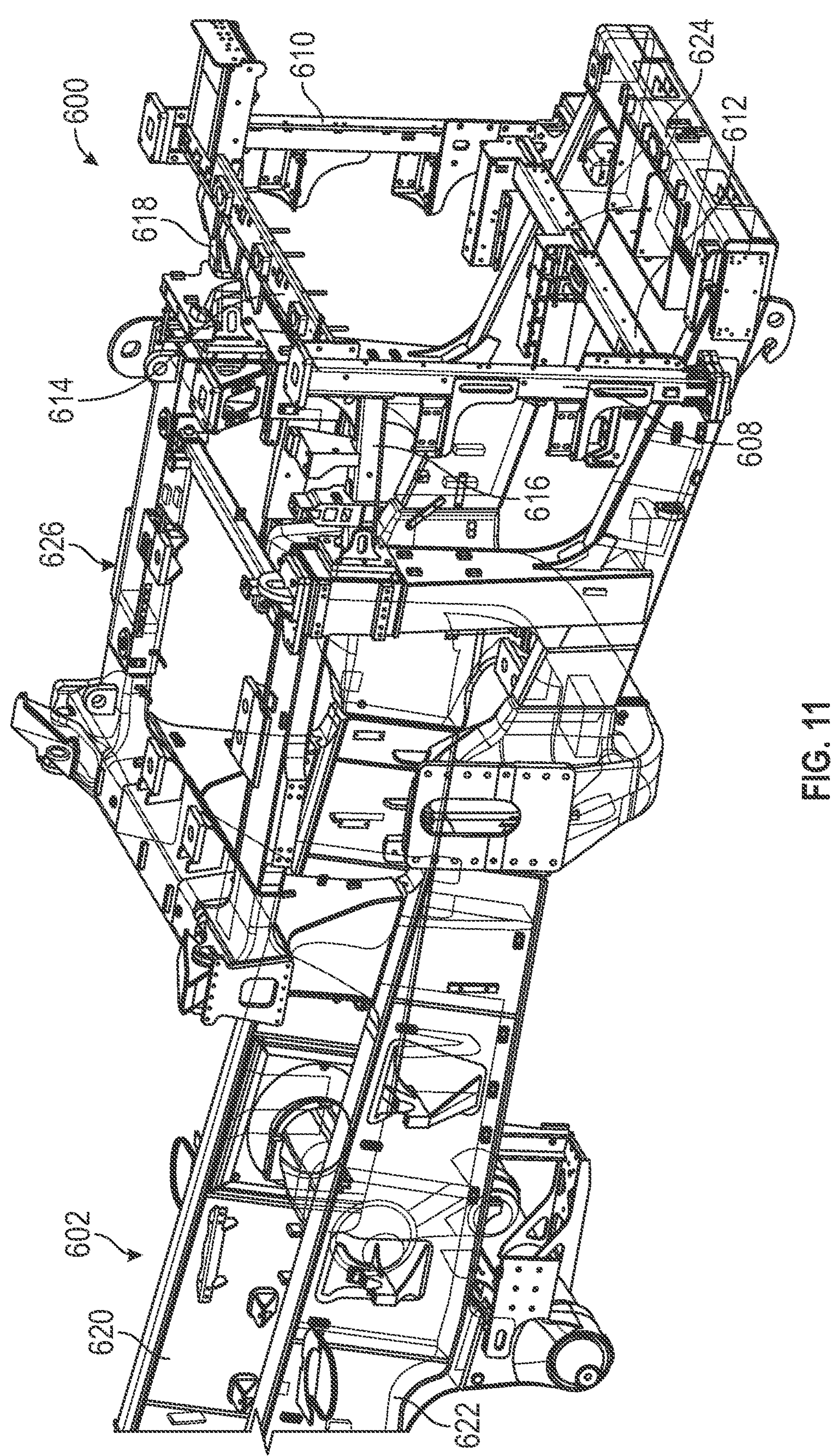
FIG. 11 is a perspective view of another example of a modular mounting structure of the present disclosure connected to a chassis.
Figure 12:
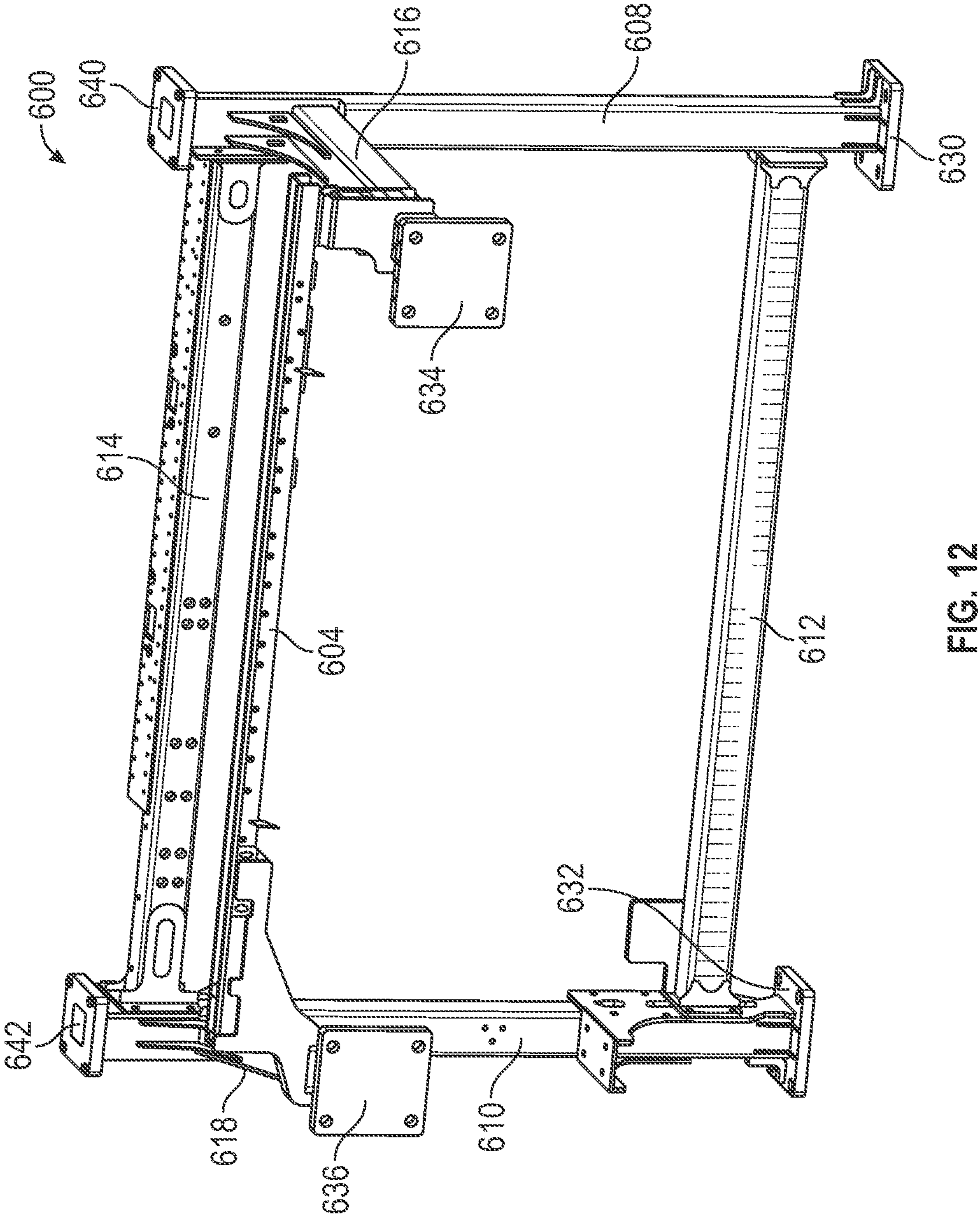
FIG. 12 is a perspective view of the modular mounting structure of FIG. 11 with modular support pieces attached thereto.

FIG. 11 is a perspective view of modular mounting structure 600 of the present disclosure connected to chassis 602. FIG. 12 is a perspective view of modular mounting structure 600 of FIG. 11 with modular support piece 604 attached thereto. FIGS. 11 and 12 are discussed concurrently.

Modular mounting structure 600 can comprise first vertical support 608, second vertical support 610, first horizontal support 612, second horizontal support 614, first horizontal extension 616 and second horizontal extension 618.

Chassis 602 can comprise left side beam 620, right side beam 622, front beam 624 and bulkhead 626. Chassis 602 can be configured similarly to chassis 300 of FIG. 5 or can comprise a different configuration. Thus, modular mounting structure 600 can be interchangeable with modular mounting structure 200 of FIG. 2 for use with the same chassis or can comprise a different design suitable for use with a different chassis. In any case, modular mounting structure 600 can be configured to receive various cooling components suitable for use with different configurations of propulsion systems used with chassis 602. Modular mounting structure 200 can be configured to interact with chassis 602 in the same manner regardless of the components mounted thereto. Additionally, regardless of the cooling component mounted to modular mounting structure 600, various modular accessory components can be mounted thereto, such as modular stairwell components, modular handrail components and modular trolley components.

As discussed with reference to FIG. 12, modular mounting structure 600 can receive various modular support elements to accommodate cooling components of different designs that are, for example, heavier than others. Modular mounting structure 600 can comprise modular support piece 604 extending between first horizontal extension 616 and second horizontal extension 618. Modular mounting structure 600 can include first mounting pad 630, second mounting pad 632, first bulkhead pad 634, second bulkhead pad 636, first accessory pad 640 and second accessory pad 642.

Modular mounting structure 600 provides another example of a structure similar to modular mounting structure 200 that can support a first variant of an accessory package to mount to a chassis, while also being able to receive modular support pieces to support heaving components of a second variant of an accessory package to mount to the same chassis. Modular mounting structure 600 can additionally connect to a modular stairwell accessory, a modular guardrail accessory and a modular trolley accessory, similar to modular guardrail accessory 270, modular stairwell accessory 272 and modular trolley accessory 400, without interfering with the ability of either variant of accessory package to mount to the chassis. Modular mounting structure 600 can be similar to modular mounting structure 200 in that each has various horizontal and vertical structural components that can mount to longitudinal structures of a chassis as well as a bulkhead or vertical wall of a chassis, and that support eh variants of the accessory package. Modular mounting structure 600 can allow the components mounted thereto to form a package that can be easily lifted and transported to facilitate manufacturing and maintenance.

INDUSTRIAL APPLICABILITY

The present application relates to modular mounting structures that allow a single mounting structure to be used with variants of a haul truck having different propulsion systems. The modular mounting structures can be modularly configured to support accessories, such as cooling accessories for internal combustion engines and electric propulsion systems, without having to produce an entirely different component. The modular mounting structure can be attached to extra support structures to provide a more robust configuration for heavier accessories that do not need to be used when supporting lighter accessories to save weight and cost. Thus, a base modular mounting structure can be used with any variant to reduce cost and part numbers, but can be modified by the addition of modular components to support some variants. The modular mounting structure can provide a platform for mounting other accessories, such as stairwells, guardrails and trolley structures. The modular mounting structures can be attached to such components as a package to provide a single assembly that can be easily lifted and transported to increase manufacturability and maintenance. The modular mounting structures also provide adequate access to components mounted thereto to further increase manufacturability and maintenance.

What is claimed is:

1. A modular frame for mounting cooling accessories for different types of propulsion systems of a work machine, the modular frame comprising:
- a first vertical support structure for attaching to a chassis of the work machine;
- a second vertical support structure for attaching to the chassis of the work machine; and
- a horizontal support structure for connecting the first vertical support structure and the second vertical support structure;
- wherein the first vertical support structure, the second vertical support structure and the horizontal support structure are arranged to define an internal cavity under the horizontal support structure for accommodating the cooling accessories.

2. The modular frame of claim 1, wherein:
- the first vertical support structure includes a first pad for attaching to the chassis; and
- the second vertical support structure includes a second pad for attaching to the chassis.

3. The modular frame of claim 1, further comprising a staircase attachable to the modular frame in the same location for different types of cooling accessories.

4. The modular frame of claim 1, further comprising a guardrail attachable to the modular frame in the same location for different types of cooling structures.

5. The modular frame of claim 1, further comprising the cooling accessories, the cooling accessories comprising:
- a radiator system of a diesel engine.

6. The modular frame of claim 1, further comprising:
- a first crosspiece extending between the first vertical support structure and the second vertical support structure; and
- a second crosspiece extending between the first vertical support structure and the second vertical support structure.

7. The modular frame of claim 6, further comprising the cooling accessories, the cooling accessories comprising:
- a cooling system for a battery system of an electric propulsion power plant.

8. The modular frame of claim 1, wherein:
- the first vertical support structure includes a third pad for attaching to a trolley structure; and
- the second vertical support structure includes a fourth pad for attaching to the trolley structure.

9. The modular frame of claim 8, further comprising the trolley structure, the trolley structure comprising:
- a first pair of posts for mating with the third pad and the fourth pad;
- a second pair of posts for mating with a location on the chassis; and
- a platform structure for supporting a pantograph of an electric trolley system.

10. The modular frame of claim 1, further comprising:
- a first horizontal connector for coupling to an upright portion of the chassis; and
- a second horizontal connector for coupling to the upright portion of the chassis.

11. A frame system for a truck, the frame system comprising:
- a chassis for connecting to wheels of the truck; and
- a removable mounting structure attached to the chassis, wherein the removable mounting structure is configured:
  - to support cooling accessories for a propulsion system of the truck; and
  - to receive one or more modular components for supporting cooling accessories for different types of propulsion systems;
- wherein the removable mounting structure comprises:
  - a first vertical support structure for attaching to the chassis;
  - a second vertical support structure for attaching to the chassis;
  - a horizontal support structure for connecting the first vertical support structure and the second vertical support structure; and
- wherein the one or more modular components comprises a first modular crossbar configured to connect the first vertical support structure and the second vertical support structure to support additional weight of different versions of the cooling accessories.

12. The frame system of claim 11, wherein the chassis comprises:
- a left side beam to which the first vertical support structure can be attached;
- a right side beam to which the second vertical support structure can be attached;
- a front crossbar connecting the left side beam and the right side beam; and
- a rear crossbar connecting the left side beam and the right side beam.

13. The frame system of claim 12, further comprising:
- a vertical wall of the chassis extending upward from the right side beam and the left side beam;
- a first vertical support structure for attaching to the chassis; and
- a second vertical support structure for attaching to the chassis.

14. The frame system of claim 11, further comprising:
- a modular staircase attachable to the removable mounting structure in the same location for different types of cooling accessories; and
- a modular guardrail attachable to the removable mounting structure in the same location for different types of cooling structures.

15. A removable cooling package for a work truck, the removable cooling package comprising:
- a modular mounting structure that can be arranged in different configurations to receive different cooling accessories for a propulsion system of the work truck; and
- a first package of cooling accessories for the propulsion system of the work truck, the cooling accessories mounted to the modular mounting structure;
- wherein the modular mounting structure can be removed from the work truck without disassembling the first package of cooling accessories from the modular mounting structure.

16. The removable cooling package of claim 15, wherein the first package comprises at least one of an air cleaner, a shunt tank and a radiator system.

17. The removable cooling package of claim 15, further comprising:
- a second package of cooling accessories for the propulsion system of the work truck, wherein the second package comprises at least one of a fan and a chiller.

18. The removable cooling package of claim 17, further comprising:

a supplemental support bar for supporting additional weight of the second package relative to the first package.

19. The removable cooling package of claim 17, further comprising:

at least one of a modular staircase and a modular guardrail attachable to the modular mounting structure in the same location for the first package and the second package.

20. A frame system for a truck, the frame system comprising:

a chassis for connecting to wheels of the truck; and a removable mounting structure attached to the chassis, wherein the removable mounting structure is configured:

to support cooling accessories for a propulsion system of the truck; and to receive one or more modular components for supporting cooling accessories for different types of propulsion systems;

wherein the removable mounting structure comprises:

a first vertical support structure for attaching to the chassis;

a second vertical support structure for attaching to the chassis; and a horizontal support structure for connecting the first vertical support structure and the second vertical support structure; and wherein the chassis comprises:

a left side beam to which the first vertical support structure can be attached;

a right side beam to which the second vertical support structure can be attached;

a front crossbar connecting the left side beam and the right side beam; and a rear crossbar connecting the left side beam and the right side beam.

* * * * *